United States Patent

Garzarolli et al.

[11] Patent Number: 6,167,104
[45] Date of Patent: Dec. 26, 2000

[54] PRESSURIZED WATER REACTOR FUEL ASSEMBLY WITH A GUIDE TUBE AND METHOD FOR PRODUCING THE GUIDE TUBE

[75] Inventors: Friedrich Garzarolli, Höchstadt; Ingo Pohlmeyer, Nürnberg; Theo Grimmelsmann, Bad Iburg; Alwin Schaa, Duisburg, all of Germany

[73] Assignee: Siemens Aktiengesellschaft, Munich, Germany

[21] Appl. No.: 09/262,463

[22] Filed: Mar. 4, 1999

Related U.S. Application Data

[63] Continuation of application No. PCT/EP97/04559, Aug. 21, 1997.

[30] Foreign Application Priority Data

Sep. 4, 1996 [DE] Germany .................... 196 35 927

[51] Int. Cl.[7] .................... G21C 3/06; G21C 3/326
[52] U.S. Cl. .................... 376/353; 376/327; 376/449; 376/457
[58] Field of Search .................... 376/353, 234, 376/261, 327, 449, 457

[56] References Cited

U.S. PATENT DOCUMENTS

| | | | |
|---|---|---|---|
| 4,684,504 | 8/1987 | Wilson et al. | 376/447 |
| 4,770,847 | 9/1988 | Plaza-Meyer et al. | 376/444 |
| 4,775,351 | 10/1988 | Baloh et al. | 376/362 |
| 4,938,918 | 7/1990 | Weiss | 376/260 |
| 5,606,583 | 2/1997 | Verdier | 376/260 |
| 5,654,993 | 8/1997 | Vesterlund et al. | 376/449 |

OTHER PUBLICATIONS

"Längenwachstum von Brennstäben mit Zry–4–Hüllrohren", R. Manzel, stromwirtschaft, Mar. 1986, pp. 563–564, pertains to the longitudinal growth of fuel rods.

"Werkstofftechnik für Brennelemente und Kernbauteile in wassergekühlten Reaktoren", R. Holzer et al., atomwirtschaft., Mar. 1986, pp. 126–131, pertains to technology for fuel elements and honeycomb bodies in water–cooled reactors.

Japanese Patent Abstract No. 59229475 (Hiromasa), dated Dec. 22, 1984.

Published International Application No., 95/01639 (Vesterlund et al.), dated Jan. 12, 1995.

Primary Examiner—Charles T. Jordan
Assistant Examiner—Kyongtack K. Mun
Attorney, Agent, or Firm—Herbert L. Lerner; Laurence A. Greenberg; Werner H. Stemer

[57] ABSTRACT

A pressurized water reactor fuel assembly with a guide tube and a method for producing a guide tube for control elements are provided. Such guide tubes in pressurized water nuclear reactors which are composed of zirconium alloys (zircaloy-2 and zircaloy-4) show sharp radiation-induced growth in the axial direction at the commencement of their use in the reactor core. The sharp initial growth of the tubes is compensated by an inherent contraction of the tubes. For this purpose, the guide tubes are given internal stresses which are reduced by tube contraction as a result of a radiation-induced supply of energy. During production, guide tubes which are too short are first produced and subsequently lengthened by at least 0.3% to a final dimension in a last production step. In order to lengthen the tube, it may be stretched on a straightening bench.

5 Claims, 2 Drawing Sheets

PRESSURIZED WATER REACTOR FUEL ASSEMBLY WITH A GUIDE TUBE AND METHOD FOR PRODUCING THE GUIDE TUBE

CROSS-REFERENCE TO RELATED APPLICATION

This application is a continuation of copending International Application No. PCT/EP97/04559, filed Aug. 21, 1997, which designated the United States.

BACKGROUND OF THE INVENTION

FIELD OF THE INVENTION

The invention relates to a fuel assembly of a pressurized water nuclear reactor, including an upper and a lower cover plate to which guide tubes for control elements are fastened, spacers carried by the guide tubes, and a bundle of fuel rods disposed around the guide tubes and held in meshes of the spacers. The invention also relates to a method for producing a guide tube from zirconium alloys (zircaloy-2 or zircaloy-4) for a fuel assembly of a pressurized water reactor.

Guide tubes in pressurized water nuclear reactors, which are composed of zirconium alloys (zircaloy-2 and zircaloy-4), show sharp radiation-induced growth in the axial direction at the commencement of their use in a reactor core. If a fuel assembly is long enough to ensure that it is reliably held by guide pins of a core grid, the head of the fuel assembly may butt against the core grid as a result of the growth in length of the guide tubes. That may lead to warping of the guide tubes, causing the fuel assembly to be exchanged in order to avoid faults and damage.

SUMMARY OF THE INVENTION

It is accordingly an object of the invention to provide a pressurized water reactor fuel assembly with a guide tube and a method for producing the guide tube, which overcome the hereinafore-mentioned disadvantages of the heretofore-known devices and methods of this general type and which ensure minimized radiation-induced growth of the guide tube.

With the foregoing and other objects in view there is provided, in accordance with the invention, a fuel assembly of a pressurized water nuclear reactor, comprising upper and lower cover plates; guide tubes for control elements, the guide tubes fastened to the cover plates, and the guide tubes having internal stresses in the factory-fresh state providing a contracting effect in axial direction; spacers carried by the guide tubes and having meshes; and a bundle of fuel rods disposed around the guide tubes and held in the meshes of the spacers.

In accordance with another feature of the invention, the internal stresses exceed 3 N/mm$^2$.

In accordance with a further feature of the invention, the internal stresses are produced by a lengthening of the guide tubes.

In accordance with an added feature of the invention, the guide tubes with the internal stresses have a greater length than guide tubes in a stress-relief state.

In accordance with an additional feature of the invention, the guide tubes with the internal stresses have a length at least 0.3% greater than guide tubes in the stress-relief state.

With the objects of the invention in view there is also provided a method for producing a guide tube from zirconium alloys for a fuel assembly of a pressurized water reactor, which comprises producing a tube having a length below a predetermined final length; and subsequently lengthening the tube to the predetermined final length.

In accordance with another mode of the invention, there is provided a method which comprises carrying out the lengthening step by lengthening the tube by more than 0.3% and preferably by at least 0.4% to 0.5%.

In accordance with a further mode of the invention, there is provided a method which comprises carrying out the lengthening step by stretching the tube by straightening on a straightening bench.

In accordance with an added mode of the invention, there is provided a method which comprises carrying out the lengthening step by straining the tube with tensile forces on a straining bench.

In accordance with a concomitant mode of the invention, there is provided a method which comprises annealing or recrystal-lization-annealing the tube, in particular subjecting the tube to β-quenching, in the two-phase zone before lengthening the tube.

Other features which are considered as characteristic for the invention are set forth in the appended claims.

Although the invention is illustrated and described herein as embodied in a pressurized water reactor fuel assembly with a guide tube and a method for producing the guide tube, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
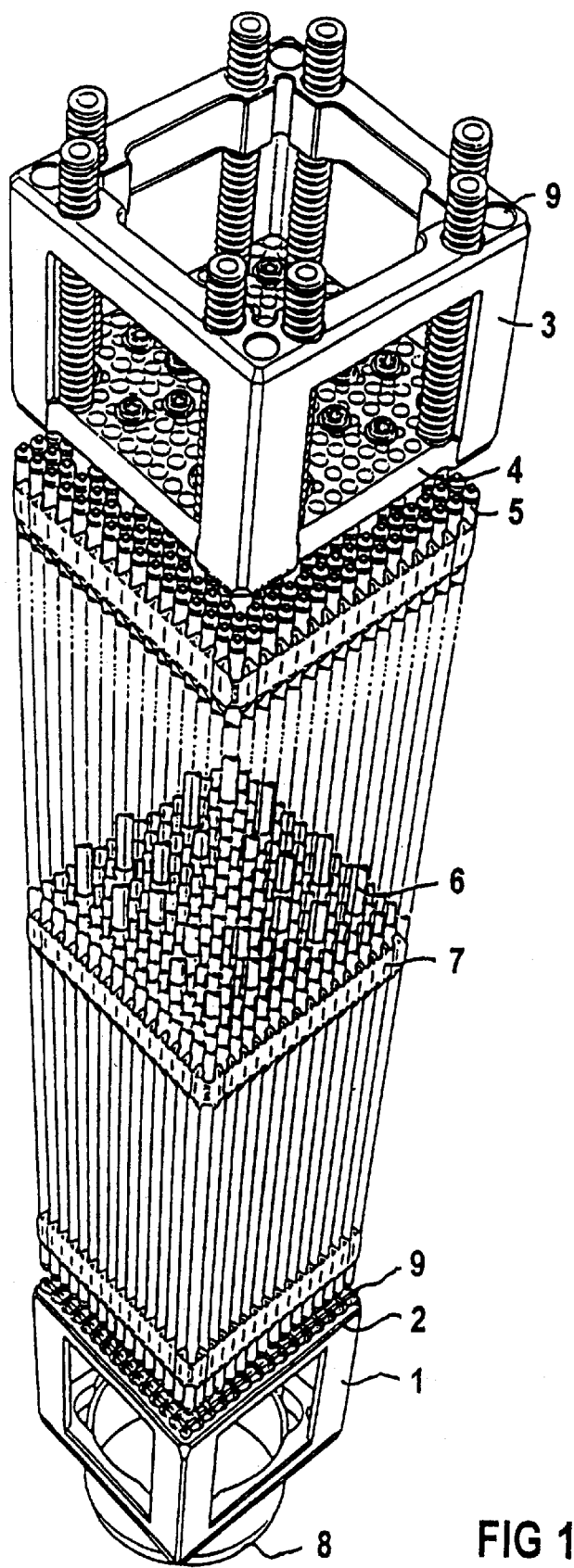
FIG. 1 is a diagrammatic, perspective view showing a basic structure of a fuel assembly for a pressurized water reactor according to the prior art.

Referring now to the figures of the drawings in detail and first, particularly, to FIG. 1 thereof, there is seen a fuel assembly for a pressurized water reactor according to the prior art. The fuel assembly has a lower end with a foot 1 which is closed off upwardly by a lower perforated plate or foot plate 2. The fuel assembly also has an upper end with a head 3 having an upper perforated plate or cover plate 4. Fuel rods 5, which are located between the foot plate 2 and the cover plate 4, have upper ends that are disposed below the cover plate 4. An interspace therefore remains between upper ends of the fuel rods and the cover plate 4. A distance between the foot plate 2 and the cover plate 4 is ensured by the fact that guide tubes 6 are located between the foot plate 2 and the cover plate 4. The guide tubes 6 are fastened to the foot plate 2, and the cover plate 4 is fastened to an upper end of the guide tubes 6. Spacers 7 are mounted between the foot plate 2 and the cover plate 4. These spacers are in the form of a grid which is formed of webs having grid meshes through which the fuel rods 5 and the guide tubes 6 are led.

The fuel assembly is inserted into a lower core grid plate of a reactor through the use of an introduction piece 8 at the lower end. Holes 9 for guide pins of an upper core grid are provided at the upper end of the head 3. The fuel assembly is held at the top in the reactor through the use of the guide pins. The core grid itself is not illustrated in FIG. 1.

Jacket tubes for the fuel rods 5 and the guide tubes 6 are formed of the reactor alloy zircaloy.

When the reactor is in operation, the jacket tubes of the fuel rods 5 and the guide tubes 6 are exposed to radiation due to thermal neutrons. It was found, and has been known for a long time, that thermal neutron radiation causes an axial growth of the jacket tubes of the fuel rods 5 and the guide tubes 6. The growth of the jacket tubes of the fuel rods 5 does not present any problem insofar as their free upper end is located so far below the cover plate 4 that the fuel rods 5 can expand into the free space below the cover plate 4.

However, the growth in length of the guide tubes 6 presents difficulties. The guide pins holding the fuel assembly on the upper core grid are relatively short. A fresh fuel assembly must therefore be so long that the guide pins of the core grid can penetrate into the holes 9 of the head 3 to a sufficient depth. If the fuel assembly is too short, it is not held sufficiently, and the guide pins may break off while the reactor is in operation. However, if the fuel assembly is so long that the guide pins of the core grid project reliably into the holes 9 in the head 3 of the fuel assembly, the head of the fuel assembly may butt against the core grid as a result of the growth in length of the guide tubes 6. This may lead to warping of the guide tubes 6, and therefore the fuel assembly has to be exchanged in good time in order to avoid faults and damage.

It was found that, during the process of producing the guide tubes 6, they are given a texture which is responsible essentially for the axial growth of the guide tubes 6. The alloys being used, zircaloy-2 and zircaloy-4, are standardized reactor alloys. Those alloys have a hexagonally very densely packed crystallographic structure (hdp) at room temperature.

At temperatures of about 790° C., the hexagonally densely packed lattice is transformed into a body-centered lattice structure, with the transformation being concluded at about 1010° C. The hexagonally densest structure is designated as the α-phase and the cubically body-centered structure as the β-phase. In the conventional production of tubes through the use of the pilger method at a temperature at which there is the hexagonally densest packing, a texture is generated in the tube such that the hexagonally most densely packed crystallites are disposed with their c-axis (that is to say, the <0001>-direction), that is to say with the direction lying in the axis of the hexagonal column, radially, that is to say relative to the tube axis.

As a result of thermal neutron irradiation, the lattice spacing in the c-direction is reduced, whereas it increases in the direction of the other crystal axes. Since the crystal axes, along which the atomic lattice spacing increases, lies in the axial direction of the guide tubes 6, this change in the lattice constants gives rise, as a whole, to a growth in length of the tubes 6.

The texture is often produced deliberately during pilgering, since corrosion resistance and other properties are influenced by it in a way which is desirable in the case of fuel rod jacket tubes, or an attempt is made to largely obliterate the texture by β-annealing or recrystallization annealing.

Figure 2:
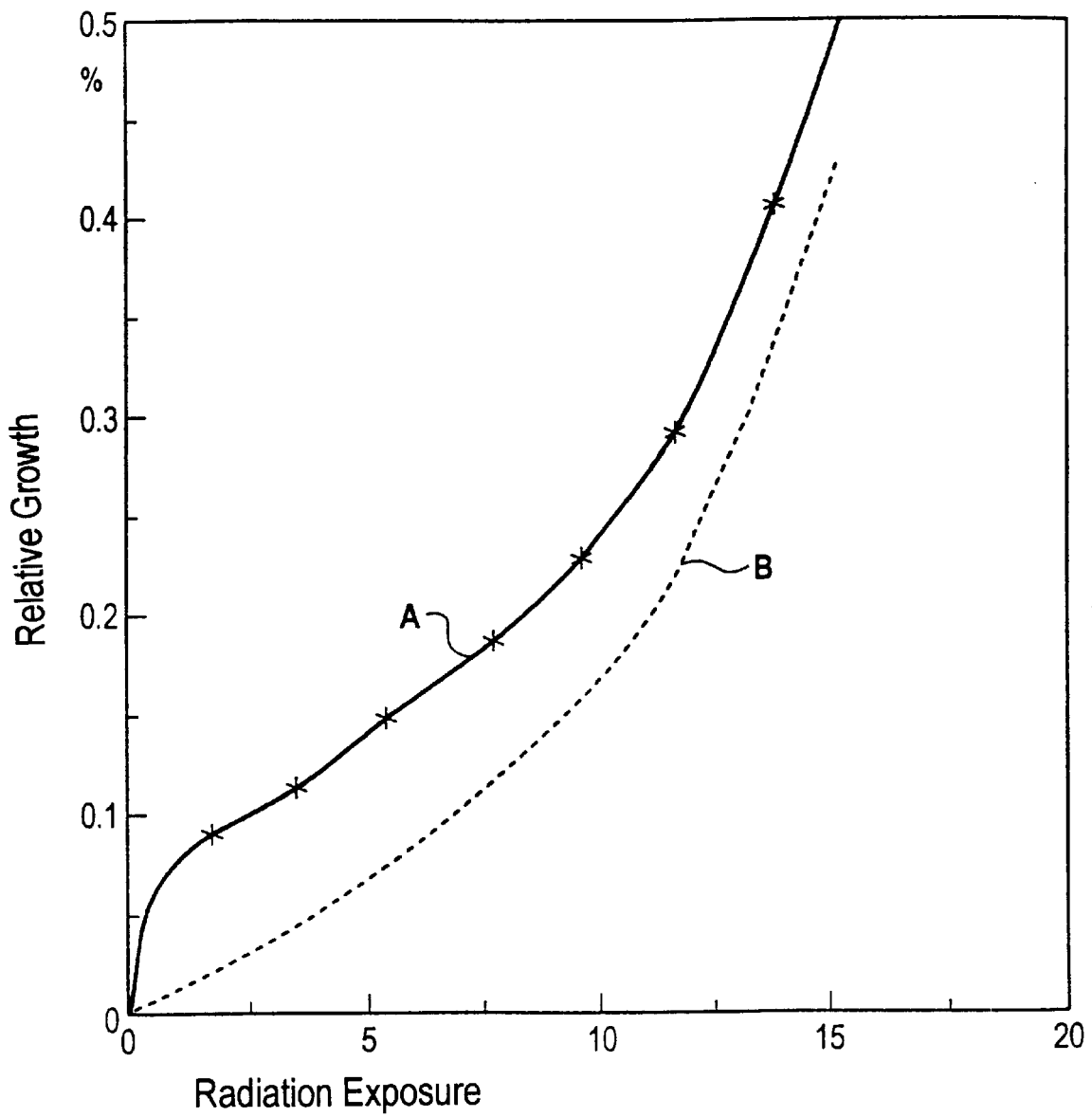
FIG. 2 is a graph showing a relative growth in length of a guide tube plotted against its radiation exposure.

The invention arises from tests in which the growth of the guide tubes 6 at the commencement of action by thermal neutrons shows a steep rise that becomes flatter with an increasing dose. After lengthy radiation exposures the growth rate increases again. Accordingly, when the relative growth in length of a guide tube 6 is plotted against its radiation exposure, the result is a curve which rises steeply in a short initial region, thereafter slowly over a longer region and increasingly steeply again toward increasingly higher radiation exposures. This is shown in a curve A of FIG. 2. The invention arises, in this case, from the fact that the duration of use of the guide tubes runs correspondingly when the sharp initial growth at the commencement of irradiation is compensated by appropriate measures during production. Specifically, growth then takes place according to a curve B of FIG. 2.

In order to anticipate the influence of the neutron radiation, an attempt could be made, if possible, to obliterate the texture by annealing, in particular-quenching after cold forming (for example, the last cold forming) and, possibly, strictly controlled heat treatment (for example, stress relief annealing). It is clear, however, that the influence of those measures is exposed to pronounced fluctuations from one item to another and does not result in an adequate outcome with sufficient reliability. The invention therefore provides this measure merely as an additional option prior to the final treatment of the guide tube.

This high growth in the initial region of thermonuclear stress can be suppressed by imparting internal stresses to the guide tubes 6. The internal stresses are released under irradiation and, at the same time, lead to a contraction in length which counteracts the radiation-induced growth in length.

According to the invention, these internal stresses are generated in such a way that the guide tube is lengthened during a straightening operation which concludes the production of the tube. For this purpose, the starting point is a tube which has first been produced in such a way that its length is smaller than the final length of the guide tube 6. In this case, the lengthening of the tube amounts to at least 0.3%, preferably at least approximately 0.4% to 0.5%, of the length of the initial tube.

Lengthening refers, in this case, to a method in which a change in length takes place in such a way that, at least in addition to other deformation forces, tensile forces directed in the longitudinal direction of the tube are applied to the tube.

The lengthening of the tube may, in principle, take place by stretching. Stretching refers, in this case, to an operation in which the tube is lengthened through the use of pressure perpendicular to the longitudinal direction (stretching direction). Thus, for example, through the use of tensile forces, the tube may first be bent through a first roller engaging on the tube on one side and subsequently be bent back again through a second roller, which engages on the tube from the opposite side. In this case, with the direction of movement and of tension of the tube being reversed more than once, not only are initial curves of the tube straightened, but the tube which has just been straightened has also become somewhat longer. At the same time, the limited elasticity of the material has been reached, at most, in some limited local regions of the tube. Where the method is concerned, it is appropriate for the tube to be lengthened during straightening on a straightening bench. In this case, the tube is stretched as a result of the pressure of straightening bench rollers.

There is often provision, in any case, for eliminating possible warping of the tube by routinely stretching the tube slightly on a stretching bench. However, that method cannot be controlled accurately and possibly leads to lengthening which is not uniform over the entire length of the guide tube. The guide tube is therefore preferably strained.

Straining refers to a lengthening of the tube as a result of tensile action, with the limit of elasticity being exceeded. In particular, virtually the only deformation forces are forces which pull the tube in its longitudinal direction (there are therefore virtually no transverse forces), and the tensile forces can be set in such a way that the limit of elasticity is reached and exceeded in all of the regions of the tube.

For this purpose, the tube can be strained on a straining bench. As a result of the tensile stress which the tube experiences on the straining bench, in this case the internal stresses in the tube are largely built up in such a way that they lie in the axial direction of the tube. This straining can easily be controlled and leads to an internal stress characteristic which is uniform in terms of amount and direction in all of the tubes being produced.

Since a texture which would be disadvantageous for guide tubes may be generated during pilgering, annealing in the β-zone (or, if appropriate, the αβ-two-phase zone), carried out before the lengthening of the tube, is proposed. The texture of the initial tube can thereby be eliminated to some extent. A further reduction in the radiation-induced tube growth is brought about as a result.

The guide tubes which can be produced in the manner described may be used in a fuel assembly described above. They have internal stresses which act in the axial direction and which are released under the influence of thermonuclear radiation exposure and the accompanying supply of energy and lead to a contraction of the tube. In order to ensure that the contraction effect comes sufficiently into action to sufficiently suppress the sharp initial growth of the guide tubes 6 or counteract this initial growth, it is expedient if the intrinsic stresses exceed 3 N/mm$^2$. These internal stresses are generated as a result of a lengthening of the guide tube. In this case, it is characteristic of the tubes with intrinsic stresses that they have a greater length than the same tubes if they were in a stress-relief state. A minimum limit of 0.3% is proposed for the amount of lengthening, while 0.4% or 0.5% may be even more advantageous.

We claim:

1. A fuel assembly of a pressurized water nuclear reactor, comprising:

upper and lower cover plates;

guide tubes for control elements, said guide tubes fastened to said cover plates, and said guide tubes having internal stresses with a contracting effect in an axial direction;

spacers carried by said guide tubes and having meshes; and a bundle of fuel rods disposed around said guide tubes and held in said meshes of said spacers.

2. The fuel assembly according to claim 1, w,herein said internal stresses exceed 3 N/mm$^2$.

3. The fuel assembly according to claim 1, wherein said internal stresses are produced by a lengthening of said guide tubes.

4. The fuel assembly according to claim 1, wherein said guide tubes with said internal stresses have a greater length than guide tubes in a stress-relief state.

5. The fuel assembly according to claim 4, wherein said guide tubes with said internal stresses have a length at least 0.3% greater than guide tubes in the stress-relief state.

* * * * *